United States Patent [19]
Coulstring

[11] 3,906,784
[45] Sept. 23, 1975

[54] BEND TEST MACHINE FOR WELD COUPON SAMPLES

[75] Inventor: Robert N. Coulstring, Hanover, Mass.

[73] Assignee: Triangle Engineering, Inc., Hanover, Mass.

[22] Filed: Aug. 14, 1974

[21] Appl. No.: 497,260

[52] U.S. Cl. .................................... 73/100; 72/219
[51] Int. Cl.² ........................................ G01N 3/20
[58] Field of Search ................ 73/100; 72/218, 219; 108/20; 60/493

[56] References Cited
UNITED STATES PATENTS

| | | | |
|---|---|---|---|
| 1,762,234 | 6/1930 | Matthews | 72/218 |
| 2,934,945 | 5/1960 | Geenen et al | 73/100 |

*Primary Examiner*—Jerry W. Myracle
*Attorney, Agent, or Firm*—Charles E. Pfund, Esq.

[57] ABSTRACT

A guided test bend machine for metal strips such as samples cut from a weld test coupon has a gear table with a geared circular edge and a pivot arm mounted at the center of the circle with a drive motor at the end of the arm driving a pinion which engages the geared edge of the table. The pivot arm has a cylindrical die mounted concentrically with the circular edge of the table and a pressure roller spaced therefrom on the arm adjustably corresponding to the thickness of the metal strip to be tested. A vise fixedly mounted on the gear table holds one end of the metal strip and the other end projects between the cylindrical die and the pressure roller such that upon driving the pinion gear the entire lever arm rotates and bends the test strip around the cylindrical die into a U-shape thereby providing a controlled test bend to a weld or other structural characteristic located at the portion of the strip which is bent around the cylindrical die.

5 Claims, 3 Drawing Figures

3,906,784

BEND TEST MACHINE FOR WELD COUPON SAMPLES

FIELD OF THE INVENTION

The field of this invention pertains to precision mechanical stress testing devices for structural parts and more particularly to a precision test machine for applying standard test bends to a sample cut from a weld coupon in accordance with predetermined industry standards.

BACKGROUND OF THE INVENTION

In all phases of construction and manufacturing where welding of metal is employed the integrity and strength of the welded joints are of primary importance in assuring construction and manufacture to specifications which rely upon the ultimate strength of the welded joint. Because of the importance of obtaining satisfactory welded joints it is standard practice to require a workman who is to be employed as a welder to take a qualification test before he is permitted to perform on the job. For this purpose the ASME (American Society of Mechanical Engineers) and the AWS (American Welding Society) both have standard specifications which must be met in order for a welder to be qualified for a job. This test usually involves welding one or more weld coupons in the form of butt welding the bevelled edges of plate or pipe and after the weld coupon is prepared cutting a standard strip sample at several points in the coupon to obtain a set of standard samples with the weld section approximately at the mid-point of the sample strip. This strip is then bent 180° with the U-shaped bend having the weld at the bottom of the U thereby applying a standard specified and maximum stress to the point of the weld deposit. An examination of these samples which have sustained a complete 180° U-shaped bend is then made to determine whether or not the weld was performed up to the aforesaid standards.

In the past, there has been considerable delay in accomplishing the aforementioned test procedure to qualify welders for the job. In applicant's copending application entitled WELD COUPON SAMPLE CUTTER, Ser. No. 485,221, filed on July 2, 1974, a weld coupon test sample cutting machine is disclosed and claimed which permits the weld coupons to be cut to provide a set of standard samples in a very brief period of time thereby permitting on the job completion of obtaining the specification test samples which are required. The present invention provides a device which when used in conjunction with the test sample cutter permits the samples to be further tested and complete the qualification on the site.

SUMMARY OF THE INVENTION

The present invention provides for a standardized bending test of samples taken from a weld test coupon which samples are in the form of metal strips having the weld deposit approximately at the mid-point thereof. To test these samples the invention provides a gear table which provides a flat working surface and has a circular outer edge extending over a sector of at least 180° and on which is centrally pivoted a lever arm. At the end of the lever arm a hydraulic motor is mounted with a pinion gear driven thereby extending below the lever arm and in engagement with the gear edge of the table. By driving the motor, the lever arm is thus propelled by gear drive around the periphery of the table between predetermined limits which preferably are greater than 180°. Fixedly mounted on the table is a vise for holding the weld sample and the lever arm has a cylindrical die and a spaced roller between which the sample strip extends such that as the arm revolves the roller bends the test strip around the cylindrical die. The cylindrical die is interchangeable to select the radius of bending for different size samples and for this purpose the pressure roller is adjustably positioned on the lever arm to adjust the spacing between the surface of the roller and the surface of the cylindrical die. The entire unit is powered by an electric motor which develops hydraulic pressure and a self-contained hydraulic supply and control system for the hydraulic motor and the lever arm.

DETAILED DESCRIPTION OF THE INVENTION

Figure 1:
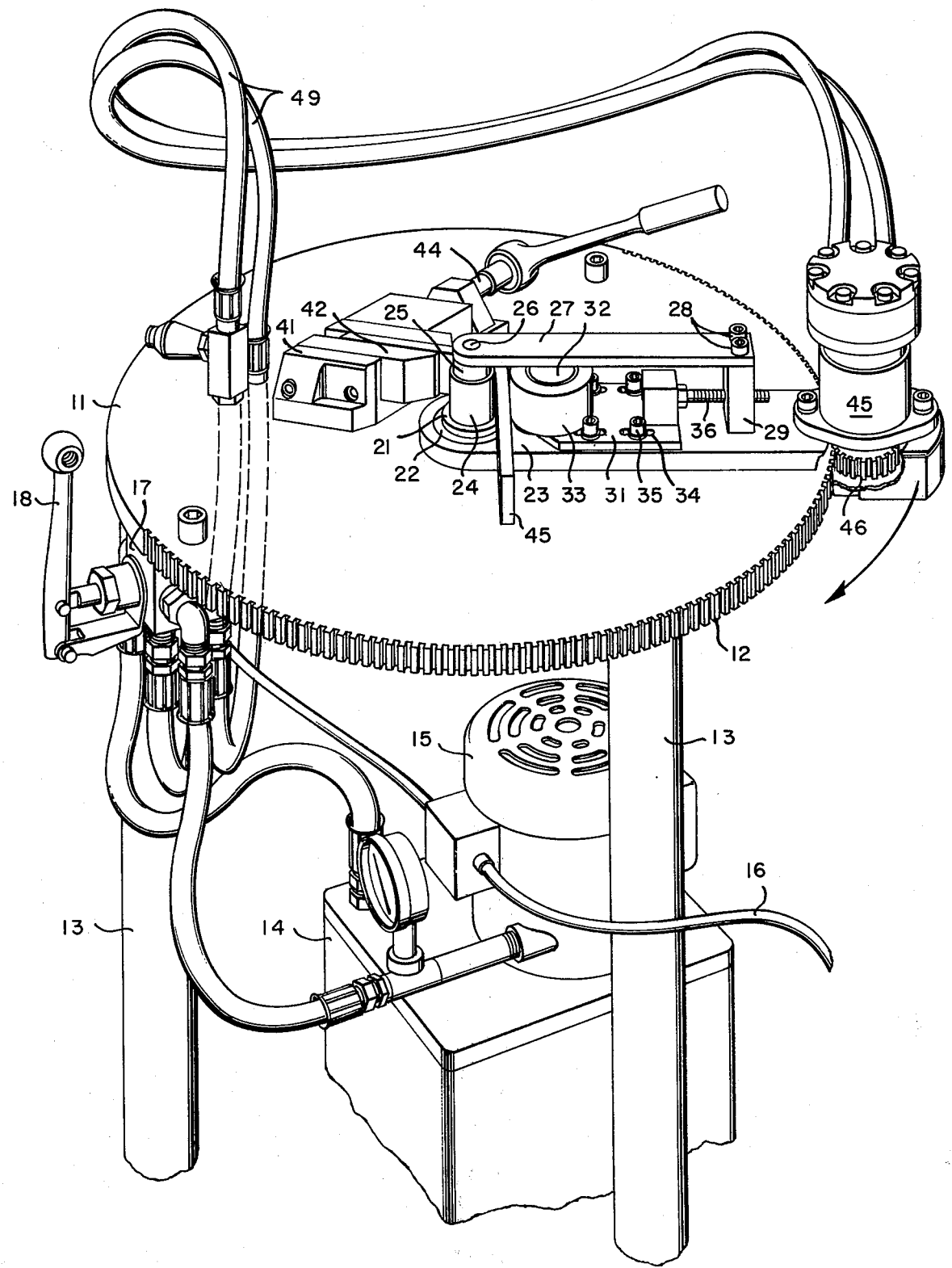
FIG. 1 is a perspective view of the precision bend test machine according to the present invention.

Referring to FIG. 1, a gear table 11 is shown as a circular steel plate which forms the mounting surface for the bending components. A portion of the edge of the gear table 11 has gear teeth 12 cut therein with the gear teeth 12 extending over a portion of the circumference greater than 180°. The gear table 11 is supported by suitable support means such as legs 13 to provide a stable, self-contained test unit. A lower shelf, not shown, on the table may support a hydraulic pressure reservoir 14 which has mounted thereon an electric motor 15 connected by cable 16 to the source of electric power for developing hydraulic oil pressure when energized by a switch, not shown. Hydraulic fluid under pressure is supplied as the working fluid to a hydraulic control system 17 operated by a manual control handle 18.

The gear table 11 has a central bored hole through which a sleeve 21 projects to support a bushing 22 on which a lever arm 23 is rotatably mounted. The sleeve 21 is internally threaded to receive the threaded end, not shown, of a cylindrical die 24 which has a reduced diameter upper portion with wrench flats 25 for tightening the die 24 in the threaded hole in sleeve 21. Although not required, the cylindrical die 24 shown in FIG. 1 has a further reduced diameter portion 26 which is rotatable in a hole drilled in the end of an upper plate 27, the other end of which is secured as by cap screws 28 to a block 29 which is secured to the upper surface of the plate 23. The upper plate 27 provides a top bearing at 26 for the cylindrical die 24 and this reenforcement is particularly useful for the large diameter sizes of die 24. Smaller diameter dies 24 do not particularly need this additional support, being adequately supported by threaded engagement with the sleeve 21.

Mounted for limited sliding motion on the upper surface of radius arm 23 is the pressure roll adjusting plate 31 which supports on a large diameter stub shaft 32 a large diameter roller 33. Adjustment of the radial position of the plate 31 is achieved by means of slot 34 and cap screws 35 projecting therethrough as shown with the adjusted position accurately set by means of a threaded rod 36 which projects through a threaded hole in block 29. By loosening the cap screws 35 and adjusting the threaded rod 36 any desired position for the pressure roll slide plate 31 within the limits of travel for the slots 34 can be selected.

Figure 2:
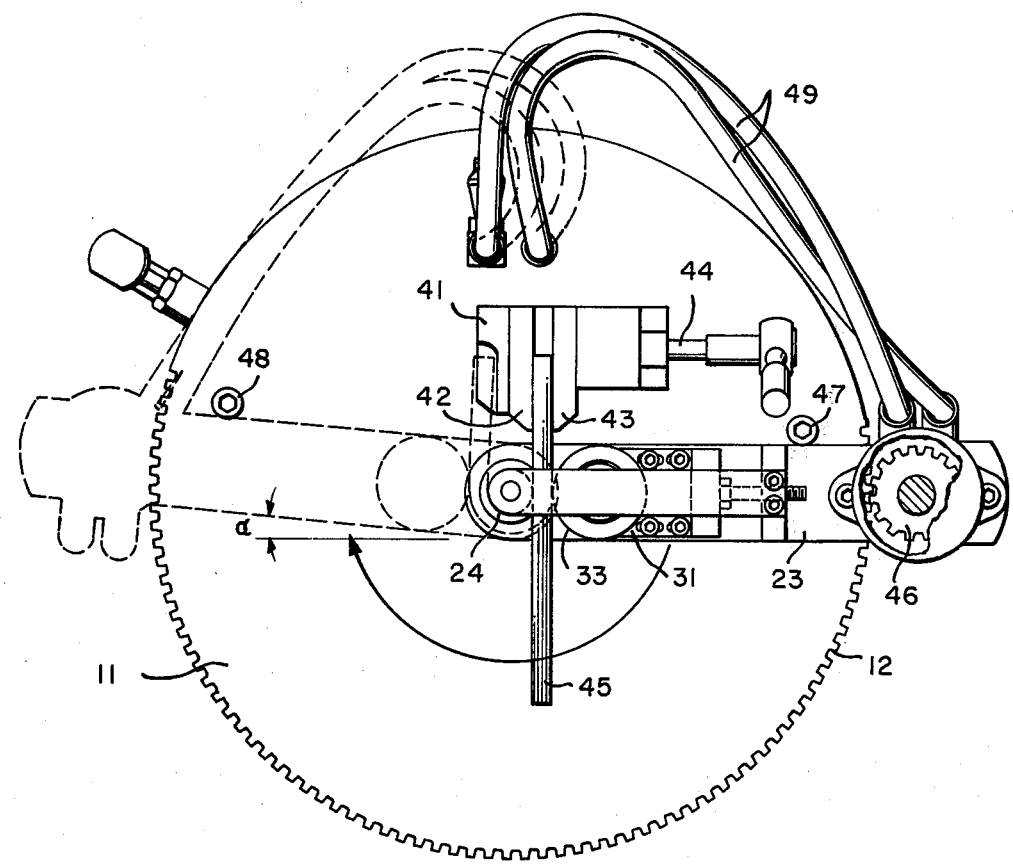
FIG. 2 is a top plan view of the device shown in FIG. 1.

Referring now to FIG. 2, further details of the invention can be seen particularly the relation of a vise 41 to the remaining components. The vise 41 has a fixed jaw 42, the gripping surface of which is aligned generally tangent with the die surface of cylindrical die 24. The vise 41 has a movable jaw 43 which can be adjusted by a conventional or ratchet driven lead screw 44 to apply gripping pressure to one end of a test sample strip 45. To conduct a test on a strip such as test strip 45, the strip 45 is inserted between the surface of cylindrical die 24 and the surface of pressure roller 33, the spacing therebetween having been adjusted by selecting the position for slide plate 31. With the test sample tightly gripped in the vice 41 and positioned between the cylindrical surfaces as shown, operation of the hydraulic control handle 18 to energize a drive motor 45 to rotate the pinion gear 46 which is in engagement with gear teeth 12 on the circular edge of the gear table 11 forceably drives the lever arm 23 around the gear table 11 in the direction of the arrow shown in FIG. 2. For the purpose of obtaining a full 180° U bend as shown by the dotted position of test sample 45 in FIG. 2, the travel for the radius arm 23 is permitted to exceed 180° as indicated by the angle α shown in FIG. 2. As a guide to the operator suitable stops 47 and 48 are provided to designate the end stops for the radial travel of the arm 23.

As shown, the hydraulic control mechanism 17 is connected to the hydraulic motor 45 by means of suitable length hydraulic hoses 49.

Figure 3:
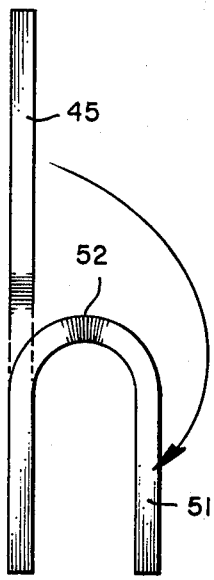
FIG. 3 is a top plan view showing a test sample in the original and bent condition.

As indicated in FIG. 3, a straight metallic test strip 45 after testing will have been bent into the U-shape as indicated by the position 51 and by centrally positioning the weld deposit 52 prior to bending, the maximum bending stress can be applied to the test weld.

The operation of the invention will be clear from the foregoing description. Certain additional features of the invention will also be apparent such as the arrangement for changing the cylindrical die 24 to select an appropriate size for the test sample to be bent. By removing top plate 27 upon removing screws 28 the cylindrical die 24 can be unscrewed from the sleeve 21 and any selected size having the same size threaded end mounted for the next test. The position of the slide plate 21 can also be adjusted to make the spacing between the surface of cylindrical die 24 and roller 33 correspond with the thickness of the test sample 45. Upon energizing the motor 45 from the position from which it is shown in FIG. 2, the test sample 45 will be bent around the cylindrical die 24 with the pressure of roller 33 applying only bending stress since the large diameter shaft 32 permits roller 33 to roll on the surface of the test sample 45 as bending is taking place. This reduces friction and permits a more uniform bending test to be formed with a minimum of torque supplied by the motor 45. As soon as the radius arm 23 has reached the dotted position shown in FIG. 2, the test sample 45 has been subjected to a complete 180° bend and can be removed upon reverse drive for the motor 45 retracting the position of lever arm 23 to its initial position. The U-shaped test sample may then be examined according to the standards for the industry to ascertain whether or not it meets those standards.

Many modifications of the disclosed embodiment of the invention may occur to those skilled in the art but the invention is not to be considered as limited specifically to the disclosed embodiment but only by the scope of the appended claims.

I claim:

1. A guided bend test machine for a weld coupon sample or the like comprising:
    a table gear in the form of a flat plate supported on a depending support means, said flat plate having a periphery at least a portion of which is a circular edge with gear teeth therein;
    a pivot bearing on said plate concentric with said circular edge;
    a lever arm rotatable around said pivot bearing on said table gear and extending beyond said circular edge;
    a pinion gear extending from said lever arm in driving engagement with said gear teeth on said circular edge;
    a drive motor mounted on said lever arm and connected to drive said pinion gear;
    a cylindrical die supported concentric with said circular edge and projecting above said lever arm;
    a pressure roll rotatably mounted on said lever arm on an axis parallel to the axis of rotation of said lever arm with a predetermined spacing between the cylindrical surfaces of said pressure roll and said cylindrical die; and
    a vise mounted on said table gear with fixed and movable jaws, the fixed jaw having a gripping surface located to hold a flat plate gripped by said jaws with one surface substantially tangent to the cylindrical surface of said cylindrical die.

2. Apparatus according to claim 1 in which said circular edge having gear teeth therein is a sector larger than a semicircle.

3. Apparatus according to claim 2 and including limit stops positioned on said table gear at points corresponding to greater than 180° relation of said lever arm.

4. Apparatus according to claim 3 and including a plate removably supported on said lever arm for receiving and supporting the upper end of said cylindrical die.

5. Apparatus according to claim 2 wherein said cylindrical die is removably supported on said table for selecting different diameter dies to determine bending radius for said sample.

* * * * *